Patented June 28, 1949

2,474,381

UNITED STATES PATENT OFFICE 2,474,381

CONCRETE COMPOSITION AND PROCESS FOR PRODUCTION THEREOF

Frank Sladick, Sr., Solvay, N. Y.

No Drawing. Application July 2, 1948,
Serial No. 36,810

8 Claims. (Cl. 106—96)

1

The present invention relates to a new and improved concrete composition and process for producing the same which is characterized by the utilization of lime waste as obtained from the commercial process for manufacturing sodium bicarbonate, said composition and process resulting in products suitable for use in masonry construction and structural units, which products are exceptionally hard, dense, strong, moisture-repellent and waterproof.

In the production of sodium carbonates, for example, sodium bicarbonate, by the ammonia soda process, a salt brine solution is saturated with ammonia, and carbonated, the sodium bicarbonate precipitating out in the presence of the ammonium chloride liquors produced in the reaction. This is the basis of the so-called Solvay process, as practiced for example by the Solvay Process Division of the Allied Chemical and Dye Corporation, at Solvay, New York. The naturally occurring brine which is ammoniated and carbonated in the process assays typically about 298.0 parts sodium chloride, about 4.4 parts of calcium sulphate, about 2.35 parts of calcium chloride, and about 0.05 part of magnesium chloride, these being parts per million.

In ammoniating this brine, the ammonia employed generally is obtained in the cheapest form of ammoniacal liquor from gas works or recovery coke ovens. These liquors contain ammonium hydroxide, ammonium carbonate, ammonium sulphide, and tarry matters. In the production of sodium bicarbonate by this process, the ammoniacal products are converted largely into ammonium chloride liquors, from which the sodium bicarbonate which is precipitated in the reaction is separated by suitable filtration operations, and the ammonia is released from these liquors for re-use in the process by treatment with milk of lime in suitable stills or columns.

This milk of lime is produced from the calcium oxide obtained by burning limestone in suitable kilns, the carbon dioxide evolved during the calcination of the limestone being employed for the carbonation of the ammoniacal brine solution. In the calcination of the limestone, there is produced a considerable excess of quicklime over that theoretically required for the decomposition of the ammonium compounds produced in the reaction. In the actual operation of the process, a considerable amount of unburned limestone accumulates in the quicklime removed from the lime kilns.

The ammoniacal liquors collected from the filters are heated, and mixed with the milk of lime obtained by mixing the quicklime from the lime kilns with water. In addition to the ammonium chloride, these ammoniacal liquors contain ammonium carbonate and ammonium bicarbonate produced by the action of carbon dioxide on the ammoniated brine. These liquors are decomposed by the milk of lime in a suitable still column, an excess of the milk of lime over that theoretically required being employed in practice. A turbid liquid comprising a sludge of calcium chloride, sodium chloride, excess calcium hydroxide, unreacted calcium carbonate and associated materials originating from the brine, the amonia employed, and the limestone, is withdrawn as a waste product from these ammonia stills.

Enormous quantities of this waste product have collected through the years, there having been no known commercial use for the same. The accumulated waste may dry sufficiently to form a crust over the surface, but beneath this crust, the material is constantly sludgy and flowable in character, and not only are the accumulations highly unsightly, but because of the fact that the body of the accumulation never dries, but remains permanently as a flowable sludge likely to break out from its confining surface crusts at any time, menaces property and health of communities rather far removed from the site of the accumulated waste; and indeed there have been instances of such accidents happening with loss of property and life.

The present invention provides a method of advantageously utilizing such waste product to advantage, and producing a product having superior strength, hardness, and moisture proofness to enable it to be used as building or structural material.

Other objects of the invention will become apparent as the description proceeds, and the features of novelty will be pointed out in particularity in the appended claims.

Obviously, the waste product referred to above will not have a fixed analysis, its composition being dependent on operating conditions at the time a particular portion of the waste material was deposited. The waste material is deposited as a sludge containing from 60% to 70% of water, by weight, which water can be driven off by suitable evaporation to leave a dry powdery product having the following typical analysis on the dry basis, the indicated percentages being by weight:

| Constituent: | Per cent |
|---|---|
| Silica, $SiO_2$ | 5.5 |
| Aluminum and iron oxides, $Al_2O_3$ and $Fe_2O_3$ | 2.0 |
| Calcium carbonate, $CaCO_3$ | 50.0 |
| Calcium hydroxide, $Ca(OH)_2$ | 11.0 |
| Calcium oxide, $CaO$ | 4.5 |
| Calcium sulphate, $CaSO_4$ | 2.5 |
| Magnesium oxide, $MgO$ | 4.0 |
| Sodium carbonate, $Na_2CO_3$ | 9.0 |
| Sodium chloride, $NaCl$ | 11.0 |
| Undetermined | 0.5 |
| Total | 100.0 |

As has been stated above, this waste is deposited as a sludge containing about 60% to 70% water. As it lies in the beds, it contains more or less water, depending on drainage and exposure.

In accordance with this invention it has been found very unexpectedly that if the dried residue of this waste product is mixed with pulverized glass and Portland cement, there is produced a product which when wet with water will set into a concrete of exceptionally high strength and hardness and density, which is both waterproof and water-repellent, and which is admirably suited for building purposes or for any purpose for which a high-strength, high-density concrete is desired. Preferably, equal parts of the dry powdered waste product, comminuted glass and Portland cement are employed, it being found in practice that the maximum desirable properties are developed in the final set concrete. The indicated parts are, of course, parts by volume. No other constituent is added. However, the above-indicated proportions may be varied within limits that are determinable in practice which will produce a good product, although as indicated above, substantially equal parts by volume of the three materials are preferred for best development of the unusual properties of the resulting set concrete. The degree of subdivision of the constituents appears to be critical only insofar as concerns the texture of the surface of the final concrete, the finer the degree of comminution of the constituents, the smoother and denser will be the finished product. In any event, the comminution must be fine enough to give a uniform mixture.

The development of the aforesaid properties is surprising and totally unexpected, and the reason therefor is not known. It has been definitely determined that the use of comminuted glass is vastly superior to other materials, such as sand, for example, since the addition of sand reduces the strength, hardness and waterproof characteristic of the concrete. Any kind of crushed glass can be employed, including any kind of scrap or waste glass.

The waste lime sludge, as described above, is dried in any suitable manner, a rotary drier heated by combustion of gas or oil fuel or by steam, being convenient, as the dried product is discharged from the kiln in powdery form and ready to be mixed with the comminuted glass and Portland cement. The resulting mixture can be stored indefinitely in closed containers without change in properties, and only requiring the addition of water to produce a concrete which sets into the high-strength, high-density concrete of this invention.

After water is added to form the slurry there may be incorporated tar or other bituminous material which forms together with the cement base a material admirably suitable for the repairing of roofs or other similar applications where a high degree of adhesion is desirable, the resulting composition being adapted to be spread with a trowel, and when so spread to a thickness of about one-fourth of an inch, the composition forms an excellent roof cover, and will adhere strongly to wood, metal, concrete or any clean and dry surface. For this purpose, about one pint of thin coal tar is mixed with about twenty-five pounds of the concrete mixture on the dry basis, this ratio being maintained for any desired quantities.

It is found in practice that variations in the composition of the lime waste referred to above in various parts of the accumulated beds is not sufficient to modify adversely the desirable properties of the finished product. It is found in practice that the finished and set product has a glaze over the surface which also encloses constituent particles and adds to the waterproof and water-repellent properties of the product, although no heat is applied to the mixed constituents at any time, so that this glaze cannot be attributed to any heat-fusion of any of the constituent materials. Tests indicate that this glaze is insoluble in water.

The product is adapted to be employed for building construction and as a masonry material wherever a high-strength concrete is desired to be employed. Except for the cement component, it is composed entirely of waste materials that have little or no economic value in themselves, and of which the lime waste component is a nuisance and a source of danger, as explained above. The term "lime waste" as employed in the claims refers to the above described waste product from the ammonia stills employed for the recovery of ammonia in the operation of the Solvay process for the manufacture of sodium carbonates. This waste always is predominantly calcareous or limey with finely divided calcium carbonate, calcium hydroxide and calcium sulphate predominating over the amounts of other constituents present in the waste. Consequently, the term "lime waste" is employed for succinctness in identifying this material.

In utilizing the product of this invention, it is only necessary to add water to the dry composition to produce a slurry of a workable consistency. This slurry is moldable into structural concrete units, such as blocks, bricks, tile, etc., having, when set, superior strength and density as has been pointed out above. The use of comminuted glass gives superior results to other siliceous products, such as sand, probably because of superior bonds obtained from the multitude of sharp edges on the glass particles. The calcium hydroxide and calcium sulphate also enhance the bond produced throughout the concrete, which concrete is given additional body by the particles of calcium carbonate in the lime waste. However, whatever the explanation may be in actuality, it is found to be factual in practice that the composition herein described does produce a highly improved building material, utilizing only waste materials that constitute a nuisance and a source of considerable potential danger.

It will be apparent to those skilled in the art that the invention is not limited to the precise proportions above set forth, but that the proportions of the ingredients, the fineness of the comminution thereof, and conditions of manufacture may be varied within rather wide limits as may be permitted by variations in the properties of the final product that the particular use to which the final product may be put, may permit, without departing from the concept of this invention. It is to be emphasized that the high-strength, high-density concrete produced by the present invention is obtained only by the addition of water to the concrete mix composed of the lime waste, comminuted glass, and cement, these being the only constituents present, except when the tar is added to the concrete slurry produced by the addition of water to the foregoing mixture when the composition is to be used for roofing or for other application requiring a tenacious adhesive product that will harden as described above. Consequently, it will be understood and 2,474,381

What is claimed is:

1. The process of utilizing lime waste produced from ammonia stills in the operation of the Solvay process for making sodium carbonates, which comprises drying the waste and commingling the dried waste with comminuted glass and Portland cement in approximately equal proportions for producing a concrete aggregate suitable for masonry construction.

2. The process of utilizing lime waste produced from ammonia stills in the operation of the Solvay process for making sodium carbonates, which comprises drying the waste, mixing the dried waste with comminuted glass and Portland cement in approximately equal proportions of each, adding water to the resulting mixture and allowing the resulting wet product to set into a concrete suitable for building and masonry construction.

3. A pulverulent concrete mix suitable for producing a high-strength, high-density concrete for building and masonry construction, which consists of substantially equal parts of dried lime waste from ammonia stills operating in the Solvay process for making sodium carbonates, comminuted glass, and Portland cement.

4. A concrete for building and masonry construction which comprises a water slurry of a concrete mix consisting of essentially equal parts of lime waste from ammonia stills operating in the Solvay process for making sodium carbonates, comminuted glass, and Portland cement, the said slurry hardening into a concrete of high-strength and high-density.

5. A concrete for building and masonry construction, which comprises a water slurry of a concrete mix consisting of substantially equal parts of lime waste from ammonia stills operating in the Solvay process for making sodium carbonates, comminuted glass and Portland cement, the slurry being moldable into structural concrete units of high-strength and high-density.

6. A concrete for use in the building arts, which comprises a water slurry of a concrete mix consisting of substantially equal parts of lime waste from ammonia stills operating in the Solvay process for making sodium carbonates, comminuted glass, and Portland cement, together with liquid coal tar in proportions of approximately one pint of the tar to twenty-five pounds of the concrete mix on a dry basis.

7. A concrete structural product obtained by setting a wet concrete mix composed of equal parts of finely divided particles of lime waste from ammonia stills operating in the Solvay process for producing sodium carbonates, waste glass and Portland cement as the constituent materials of the concrete, the said product being characterized by high strength, density and waterproofness and having a water-insoluble glaze covering the surface of the product and enclosing the particles of the constituent materials, thereby imparting water-repellent characteristics to the concrete.

8. A concrete structural product obtained by setting a wet concrete mix composed of equal parts of finely divided particles of lime waste from ammonia stills operating in the Solvay process for producing sodium carbonates, waste glass and Portland cement as the constituent materials of the concrete, the said product being characterized by high strength, density and water-proofness.

FRANK SLADICK, SR.

REFERENCES CITED

The following references are of record in the file of this patent:

UNITED STATES PATENTS

| Number | Name | Date |
|---|---|---|
| 146,864 | Boudrye | Jan. 27, 1874 |
| 789,610 | Hulsberg | May 9, 1905 |
| 1,404,060 | Rich | Jan. 17, 1922 |
| 2,302,988 | Wetty | Nov. 24, 1942 |

FOREIGN PATENTS

| Number | Country | Date |
|---|---|---|
| 481,752 | Great Britain | 1938 |